United States Patent [19]

Michaelis

[11] Patent Number: 4,694,228
[45] Date of Patent: Sep. 15, 1987

[54] COMPENSATION CIRCUIT FOR CONTROL SYSTEM PROVIDING PULSE WIDTH MODULATED DRIVE SIGNAL

[75] Inventor: Theodore D. Michaelis, Burlington County, N.J.

[73] Assignee: RCA Corporation, Princeton, N.J.

[21] Appl. No.: 842,652

[22] Filed: Mar. 21, 1986

[51] Int. Cl.⁴ .......................... F25B 1/00; H02P 5/26
[52] U.S. Cl. ..................................... 318/341; 318/599; 318/471; 318/472; 318/473; 366/145; 62/227
[58] Field of Search .................... 348/599, 601–611, 348/628, 634, 641, 139, 318, 55, 257, 341, 67, 77, 60, 52, 70, 330, 345 R, 345 B, 399, 434, 471, 432, 472, 332, 334, 81, 16; 366/144, 145, 146, 147, 601, 249, 251; 307/117; 361/23–27, 32, 34, 37; 62/433, 135, 435, 132, 156, 228.1, 228.2, 227, 226, 505, 508, 229

[56] References Cited

U.S. PATENT DOCUMENTS

| | | | |
|---|---|---|---|
| 3,446,992 | 5/1969 | Webb | 307/265 |
| 3,527,991 | 9/1970 | Sackin | 318/473 X |
| 3,731,173 | 5/1973 | Pinckaers | 318/471 |
| 3,743,911 | 7/1973 | Erler | 318/599 |
| 3,780,532 | 12/1973 | Norbeck et al. | 62/226 X |
| 3,803,863 | 4/1974 | Jednacz et al. | 62/227 X |
| 3,867,687 | 2/1975 | Gealt | 318/634 X |
| 4,061,949 | 12/1977 | Griffis | 318/473 X |
| 4,075,865 | 2/1978 | Wills | 318/472 X |
| 4,168,456 | 9/1979 | Isobe | 318/471 |
| 4,214,234 | 7/1980 | Cunningham, Jr. et al. | 340/347 AD |
| 4,313,402 | 2/1982 | Lehnhoff et al. | 318/471 X |
| 4,381,480 | 4/1983 | Hara et al. | 318/471 |
| 4,409,933 | 10/1983 | Inoue | 318/471 X |
| 4,485,635 | 12/1984 | Sakano | 62/227 X |
| 4,498,311 | 2/1985 | Sakano et al. | 62/227 |
| 4,506,518 | 3/1985 | Yoshikawa et al. | 62/227 X |
| 4,537,042 | 8/1985 | Nishi et al. | 62/227 X |
| 4,551,025 | 11/1985 | Ames et al. | 366/145 X |
| 4,551,760 | 11/1985 | Bendell | 358/213 |
| 4,599,548 | 7/1986 | Schultz | 318/257 X |
| 4,618,805 | 10/1986 | Hornung | 318/301 X |

FOREIGN PATENT DOCUMENTS 0131818 10/1980 Japan .................................. 318/634

Primary Examiner—Bernard Roskoski
Assistant Examiner—Shik Luen Paul Ip
Attorney, Agent, or Firm—Clement A. Berard, Jr.; William H. Meise; Christopher L. Maginniss

[57] ABSTRACT

A closed-loop, temperature-controlled cooling system includes a Stirling cycle refrigerator driven by a dc motor, wherein the motor excitation derives from pulse width modulation. Temperature control of the cooling system is provided by a temperature-sensitive bridge circuit which responds to variations in temperature by generating an error voltage which effects a change in the modulator duty cycle. The amount of cooling is directly related to the average voltage applied to the motor, which is a function of the modulator duty cycle and the amplitude of the supply voltage. A compensation circuit is disclosed which responds to variations in the voltage amplitude of an unregulated supply by coupling an error signal to the bridge circuit to thereby affect the modulator duty cycle.

14 Claims, 2 Drawing Figures

COMPENSATION CIRCUIT FOR CONTROL SYSTEM PROVIDING PULSE WIDTH MODULATED DRIVE SIGNAL

The present invention relates generally to control systems and, more particularly, to a control system providing a pulse width modulated drive signal, wherein a compensation circuit adjusts the pulse widths in response to variations in the power supply voltage.

BACKGROUND OF THE INVENTION

The purpose of cooling electronic equipment is to keep the temperature of the electronic components at some desired temperature. In some cases, in order to achieve the desired electronic performance, the electronic component must be cooled to a temperature below the temperature of its surroundings. In these cases, refrigeration equipment is used to pump the heat from the component into the surroundings. A typical electronic device requiring refrigeration is an infrared detector.

The Stirling cycle is a power-producing thermodynamic cycle using four basic thermodynamic processes. A Stirling cycle engine is basically a closed cycle system using regenerators to aid in the transfer of heat into and out of a working fluid. Although the Stirling cycle engine did not compete successfully with the later-developed steam and internal combustion engines, the Stirling cycle is still widely used in refrigeration.

When the motive power for a Stirling cycle refrigerator is a dc electric motor, it may be approximated that the amount of heat removed by the refrigerator is proportional to the voltage applied across the stator windings of the motor. Thus, in a closed-loop, temperature-controlled cooling system, the amplitude of the motor drive signal determines the amount of heat removed by the refrigeration apparatus and, therefore, the temperature of the cooled device.

In some cooling systems of this type, the motor is driven from a linear amplifier. Amplifiers are easily and efficiently compensated for supply voltage variations; however, in this type of system, a linear amplifier is highly dissipative, thereby contributing to inefficiency in the cooling system. Another form of motor drive uses pulse width modulation, which, for a sufficiently high pulse frequency, is very efficient in this type of cooling system.

In a typical pulse width modulation scheme, the duty cycle is controlled by an error signal generated from a temperature-sensitive transducer. However, because a dc motor is responsive to the average applied voltage for its rotational speed, it is easily seen that the pulse width modulation method depends upon a constant supply voltage. An increase in supply voltage will increase the average motor voltage, increasing the motor velocity, causing the temperature of the cooled device to drop. Although the inherent nature of the closed-loop system will eventually bring about self-correction, such temperature swings resulting from power supply variations are highly undesirable.

The effects of power supply variations can be reduced either by regulating the power supply or by compensating for the effects. The cost and complexity of regulating a power supply, particularly where it is employed as a power source for a large number of systems having current drains which vary over time, makes this an impractical option. It is therefore more practical to include in the cooling system an apparatus which compensates for the effect of power supply variations.

SUMMARY OF THE INVENTION

In accordance with the principles of the present invention, an apparatus is disclosed for use in a control system. The control system includes a sensing bridge circuit for producing an error voltage proportional to deviations from a predetermined sensed parameter. The control system also includes a driver circuit coupled between a power supply and a load circuit. The driver circuit provides pulses of the voltage of the power supply to the load circuit. The driver circuit is responsive to the bridge circuit error voltage for determining the width of the pulses. The load circuit is responsive to an average voltage level applied thereto, the average voltage level being the product of the power supply voltage and the pulse duty cycle. The disclosed apparatus compensates for variations in the average voltage level due to variations in the power supply voltage. The apparatus comprises means coupled to the sensing bridge circuit and to the power supply for providing a signal proportional to the power supply voltage, the signal affecting the balance of the sensing bridge circuit such that a change in the power supply voltage effects a change in the width of the driver circuit pulses.

DETAILED DESCRIPTION OF THE PREFERRED EMBODIMENT

Figure 1:
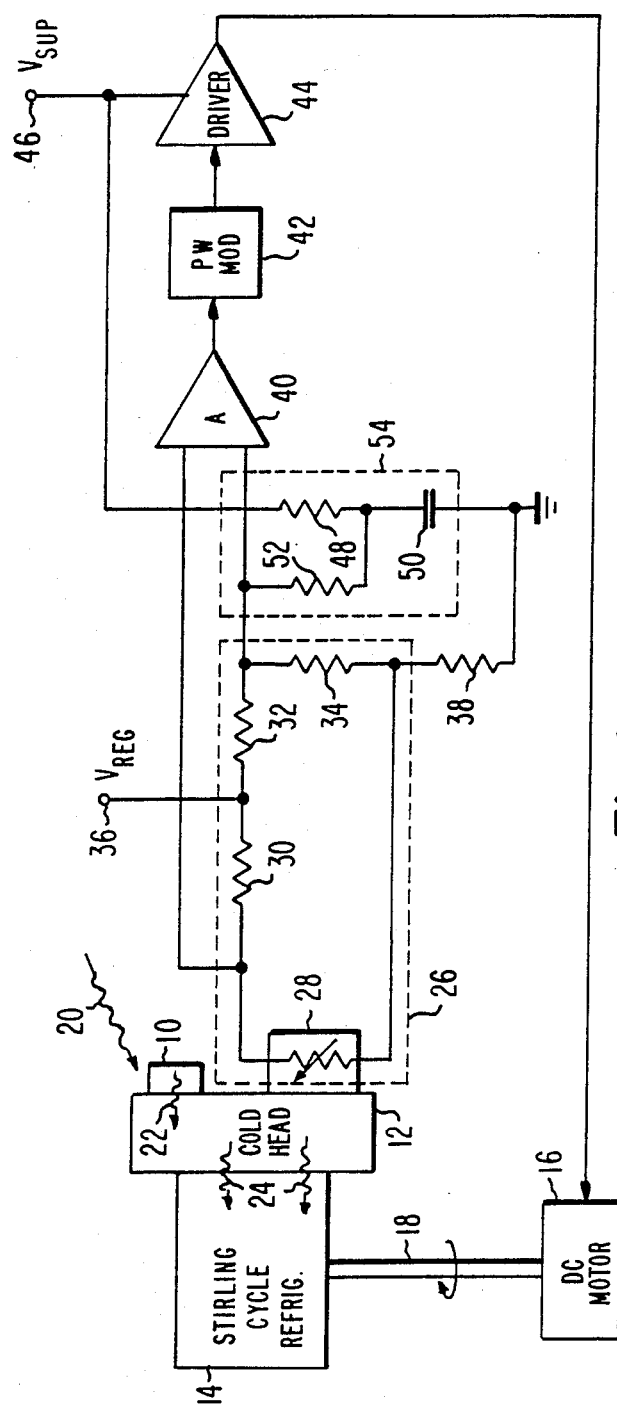
FIG. 1 is a block diagram representation of a closed loop Stirling cycle cooling system including the present invention.

Referring to FIG. 1, there is shown a temperature-controlled cooling system according to the present invention. Device 10, which may typically comprise a charge-coupled device (CCD) infrared (IR) detector, is to be maintained at a constant temperature well below the ambient temperature, typically at 73° K. Device 10 is mounted for cooling directly on cold head 12 of Stirling cycle refrigerator 14, which is driven through its cooling cycles by dc motor 16 via connecting shaft 18.

Device 10 is heated via its $I^2R$ drop, by the heat of its ambient surroundings (shown as wavy arrow 20) and, in the case of an IR detector, by the radiant energy of the scene being detected. In the present example, the power dissipation across device 20 is typically 180 milliwatts, the heat absorbed from its surroundings is typically 300 milliwatts, and the scene radiance is relatively negligible. The heat of device 19 (shown as wavy arrow 22) is drawn into cold head 12 which, in turn, transfers its heat (shown as wavy arrows 24) into refrigerator 14 during its cooling cycles.

The temperature of cold head 12, and therefore the temperature of device 10, is measured using sensing bridge circuit 26 which comprises temperature sensitive resistor 28, mounted directly on cold head 12 adjacent device 10, and resistors 30, 32 and 34. The series combination of resistors 28 and 30 comprises the variable resistance leg of bridge circuit 26, and the series combination of resistors 32 and 39 comprises the fixed resistance leg.

Resistor 28 exhibits values of resistance which vary with temperature. In the present example, resistor 28 is a platinum resistance sensor which may be a type 118MF-2000 sensor sold by Rosemount, Inc., Eden Prarie, Minn. At 73° K, the resistance of resistor 28 is 340 ohms and, in the temperature range of interest, the resistance of resistor 28 varies by approximately eight ohms per °K. Fixed-value resistors 30, 32 and 34 are precision resistors and may be a type similar to Model S102C resistors, sold by Vishay Intertechnology, Inc., Malvern, Pa. In the present example, resistors 30, 32 and 34 have resistance values of 340 ohms, and are extremely stable over wide temperature ranges, illustratively having a spread of ±1.5 parts per million per °C. over the range of interest.

Current is provided through the two legs of bridge circuit 26 from a regulated power supply (not shown), which is coupled between input terminal 36 and ground. The current which passes through bridge circuit 26 also passes through resistor 38, typically having resistance of 82.5 ohms. Resistor 38 is used to set the desired power dissipation through sensor resistor 28 which, for a regulated power supply voltage of 5.0 volts, is 12 milliwatts.

As is well known in the art, the balance of bridge circuit 26 is determined by detecting the differential voltage between the node joining resistors 28 and 30 and the node joining resistors 32 and 34. The differential voltage is applied at the two input terminals or error amplifier 40, which may typically be an operational amplifier.

The amplified error voltage which is the output signal from amplifier 40 is coupled to the input terminal of pulse width modulator 42. Modulator 42 generates a signal comprising a sequence of pulses of fixed amplitude and frequency, but which vary in width according to the amplitude of the error signal provided by amplifier 40. In the present example, modulator 42 may be similar to type SG1524B Regulating Pulse Width Modulator, sold by Silicon General, Inc., Garden Grove, Calif. The SG1524B modulator includes an error amplifier of the type shown as amplifier 40 in this description. In the preferred embodiment, modulator 42 generates pulses having amplitude switching between 0 and 5.0 volts, at a frequency of 82 KHz.

The pulsed output signal from pulse width modulator 42 is coupled to the input terminal of driver 44. Driver 44 is additionally coupled to a source (not shown) of high-current potential which is applied at input terminal 46. In the present example, the potential at terminal 46 is unregulated; it assumes a nominal value of 28 volts, although it may range between 24 and 32 volts. The switching element of driver 44 may typically comprise a power MOSFET transistor, such as type IRF130, sold by International Rectifier Corporation, Los Angeles, Calif.

Figure 2:
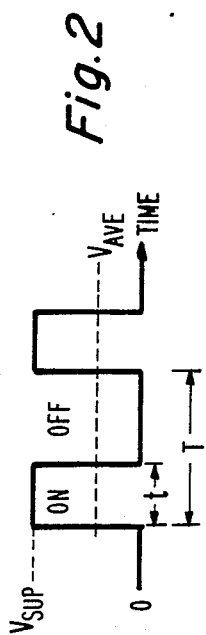
FIG. 2 is a pulse width modulated waveform useful in illustrating the operation of the system of FIG. 1.

FIG. 2 illustrates the waveform of the output signal from driver 44 which is coupled to the input terminal of dc motor 16, thereby controlling the amount of heat removed by refrigerator 14. The waveform of FIG. 2 shows the ON and OFF pulses of the driver 44 output signal. It may be seen from earlier paragraphs that modulator 42 responds to the error signal from amplifier 40 for establishing the time duration t of the ON pulse relative to the period T of the pulse cycle, the quantity (t/T) being referred to as the modulator duty cycle. It is also easily seen that the average voltage $V_{AVE} = V_{SUP}(t/T)$, where $V_{SUP}$ is the amplitude of the unregulated supply voltage coupled at terminal 46. Thus, it is clear that variation $V_{SUP}$ will cause in changes in $V_{AVE}$, ultimately resulting in changes in cooling, which changes are unrelated to the temperature sensed by temperature sensing resistor 28.

In accordance with the present invention, a compensation circuit 54, comprising resistors 48 and 52 and capacitor 50, is coupled between supply voltage terminal 46 and bridge circuit 26 for the purpose of correcting the bridge error voltage for the effects of variation in the unregulated supply voltage. Resistors 48 and 52 are coupled in series between terminal 46 and the juncture of resistors 32 and 34 in the fixed reistance leg of bridge circuit 26. Capacitor 50 is coupled between the juncture of resistors 48 and 52 and ground, and, together with resistors 48 and 52, comprises a low pass filter, such that high frequency pulses of the voltage at terminal 46 do not effect changes in the error voltage generated by bridge circuit 26.

While the purpose of the low pass filter network is to prevent instability, as mentioned above, the main function of the series combination of resistors 48 and 52 is to unbalance bridge circuit 26 is response to variation in the unregulated supply voltage $V_{SUP}$ in such a manner that the resulting pulse width change at the output of driver 44 produces essentially no change in the average voltage $V_{AVE}$ coupled to motor 16. That is, compensation circuit 54 responds to a change in $V_{SUP}$ by causing a pseudo-temperature change in the balance of bridge circuit 26 which induces modulator 42 to adjust the width t of the ON pulse, thereby maintaining a constant value of $V_{AVE}$ and keeping $V_{AVE}$ independent of $V_{SUP}$. In particular, if the amplitude of $V_{SUP}$ increases, bridge circuit 26 will unbalance in a direction so as to decrease the duty cycle output of pulse width modulator 42. Similarly, if the amplitude of $V_{SUP}$ decreases, bridge circuit 26 will unbalance in a direction so as to increase the duty cycle output of modulator 42.

In the present example, using the voltages and component values indicated earlier, resistors 48 and 52 may each have resistance values of 121 kilohms and capacitor 50 may have capacitance value of 0.1 microfarad. One effect of the inclusion of compensation circuit 54 to bridge circuit 26 is the need to slightly adjust the resistance value of resistor 34 in order to provide a zero voltage error output from bridge circuit 26 at the desired temperature for the nominal value of $V_{SUP}$.

A closed-loop, temperature-controlled cooling system having the component values and embodying the principles described above was built and found to perform with a temperature regulation having a standard deviation equal to 0.0015° K.

While the principles of the present invention have been demonstrated with particular regard to the illustrated structure of the figures, it will be recognized that various departures from such illustrative structure may be undertaken in practice of the invention. As an example, while the variable resistance of the bridge circuit has been shown as a temperature sensitive resistor, it may be any form of transducer that produces a resistance change in response to, for example, changes in force, light or displacement. Thus, the system of the present invention may be useful in controlling operating parameters other than temperature. The scope of the this invention is therefore not intended to be limited to the structure disclosed herein but should instead be gauged by the breadth of the claims which follow.

What is claimed is:

1. In a control system including a sensing bridge circuit for producing an error voltage in response to deviations from a predetermined sensed parameter, and a modulator-driver circuit coupled to said bridge circuit, to a direct voltage power supply and to a load circuit, said modulator-driver circuit providing pulses of the voltage of said power supply to said load circuit, said modulator-driver circuit being responsive to said bridge circuit error voltage for establishing the width of said pulses, said load circuit being responsive to an average voltage level applied thereto, said average voltage level being the product of the voltage of said direct-voltage power supply multiplied by the pulse duty cycle, an apparatus for compensating for variations in said average voltage level due to variations in said power supply voltage, said apparatus comprising:

providing means coupled to said sensing bridge circuit and to said power supply for providing a signal responsive to said voltage of said direct voltage power supply, said signal affecting the balance of said sensing bridge circuit such that a change in said power supply voltage effects a change in the width of said driver circuit pulses.

2. The apparatus according to claim 1 wherein said sensing bridge circuit includes a resistor whose resistance varies with temperature, said sensed parameter of said control system being temperature.

3. The apparatus according to claim 2 wherein said load circuit includes a dc motor driving a Stirling cycle refrigerator having a cold head, said resistor of said sensing bridge circuit being positioned in thermal contact with said cold head, said control system being a closed-loop system.

4. The apparatus according to claim 2 wherein said sensing bridge circuit includes a fixed leg and a variable leg, said fixed and variable legs being connected in parallel between first and second sources of potential, said fixed leg comprising first and second fixed resistors connected in series, said second leg comprising a third fixed resistor connected in series with said temperature-variable resistor, said error voltage being established between the juncture of said first and second fixed resistors and the juncture of said third fixed resistor and said temperature-variable resistor.

5. The apparatus according to claim 1 wherein said providing means includes a resistor coupled between said power supply and the juncture of said first and second fixed resistors, such that a change in said power supply voltage effects a change in said error voltage so as to maintain said average voltage level applied to said load circuit substantially constant.

6. The apparatus according to claim 5 wherein said providing means further includes a low pass filter to prevent high frequency pulses on said power supply voltage from effecting changes in said error voltage.

7. The apparatus according to claim 1 wherein said modulator-driver circuit includes a pulse width modulator.

8. A temperature-controlled cooling system comprising:
a Stirling cycle refrigerator including a cold head;
an electric motor for providing motive power to said refrigerator;
a bridge circuit for producing an error voltage in response to deviations from a predetermined temperature of said cold head;
source means for providing direct electric potential;
a modulator-driver circuit coupled to said motor and to said source means, said modulator-driver circuit producing and providing pulses of the elecric potential of said source means to said electric motor, said modulator-driver circuit being responsive to said bridge circuit error voltage for establishing the width of said pulses; and
compensation means coupled to said bridge circuit and to said source means for providing a signal responsive to said source means potential, said signal affecting the balance of said bridge circuit such that a change in said source means potential effects a change in the width of said pulses produced by said modulator-driver circuit.

9. The system according to claim 8 wherein said bridge circuit includes a resistor whose resistance varies with temperature.

10. The system according to claim 9 wherein said bridge circuit includes a fixed leg and a variable leg; said fixed and variable legs being connected in parallel and to a source of fixed voltage, said fixed leg comprising first and second fixed resistors connected in series with a first juncture therebetween, said second leg comprising a third fixed resistor connected in series with said temperature-variable resistor with a second juncture therebetween, said error voltage being established between said first and second junctures.

11. The system according to claim 10 wherein said compensation means includes a resistor coupled between said source means and said first juncture, such that a change in said source means potential effects a change is said error voltage so as to maintain the average voltage level applied to said motor substantially constant, said average voltage level being the product of said potential of said source means and the duty cycle of said pulses.

12. The system according to claim 11 wherein said compensation means further includes a low pass filter to prevent high frequency pulses on said source means potential from effecting change in said error voltage.

13. The system according to claim 8 wherein said modulator-driver circuit includes a pulse width modulator.

14. A control system comprising:
a source of stable potential;
a resistive sensing bridge circuit coupled to said source of stable potential for producing error voltage in response to deviations from a standard value of a particular sensed parameter;
voltage-sensitive parameter-controlling means including a drive input terminal for changing the value of said parameter in response to the average value of a drive voltage applied to said drive input terminal;
a source of direct unregulated voltage;
width modulations and drive means coupled to said bridge circuit, to said source of direct unregulated voltage, and to said drive input terminal of said parameter-controlling means, for receiving said error signal from said bridge circuit, for generating width modulated pulses of unregulated voltage in response to said error voltage, the amplitude of which pulses undesirably responds to variations of said direct unregulated voltage, and for coupling said width modulated pulses of unregulated voltage to said drive input terminal of said parameter-controlling means, for closing a feedback loop tending to maintain said sensed parameter constant but wherein said variations in said amplitude of said direct unregulated voltage undesirably results in variations in the value of said sensed parameter; and compensation means coupled to said source of direct unregulated voltage and to said bridge circuit for coupling a sample of said direct unregulated voltage to said bridge circuit for modifying said error voltage in a manner tending to eliminate said variation of said value of said sensed parameter in response to said variations in said amplitude of said direct unregulated voltage.

* * * * *